J. JOHNSON.
ROTARY ENGINE.
APPLICATION FILED DEC. 14, 1912.
1,064,226.
Patented June 10, 1913.
4 SHEETS—SHEET 3.
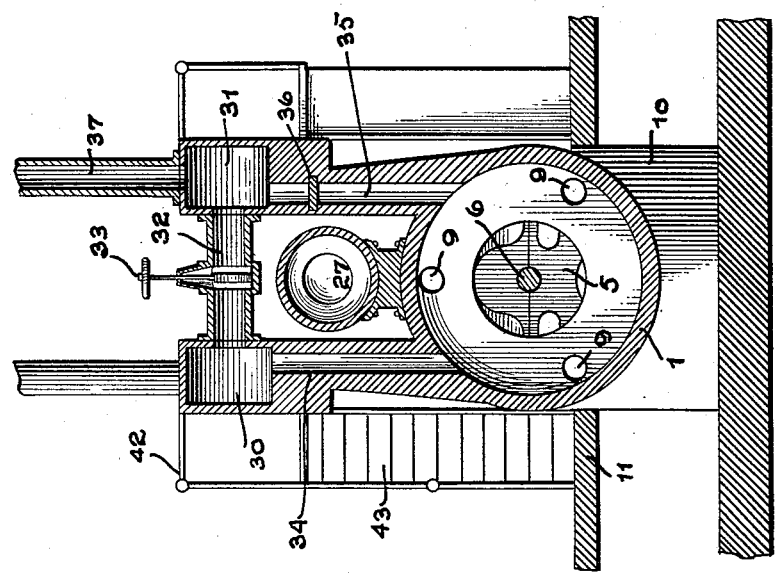
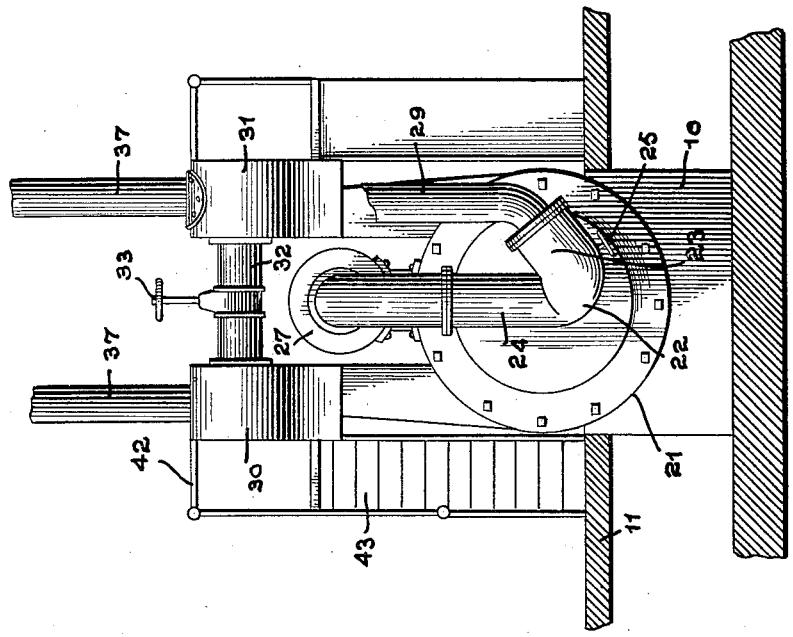
Witnesses
Inventor
John Johnson.
By Joshua R. H. Potts
Attorney J. JOHNSON.
ROTARY ENGINE.
APPLICATION FILED DEC. 14, 1912.
1,064,226.
Patented June 10, 1913.
4 SHEETS—SHEET 4.
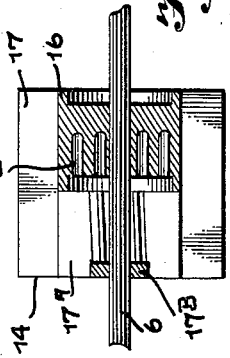
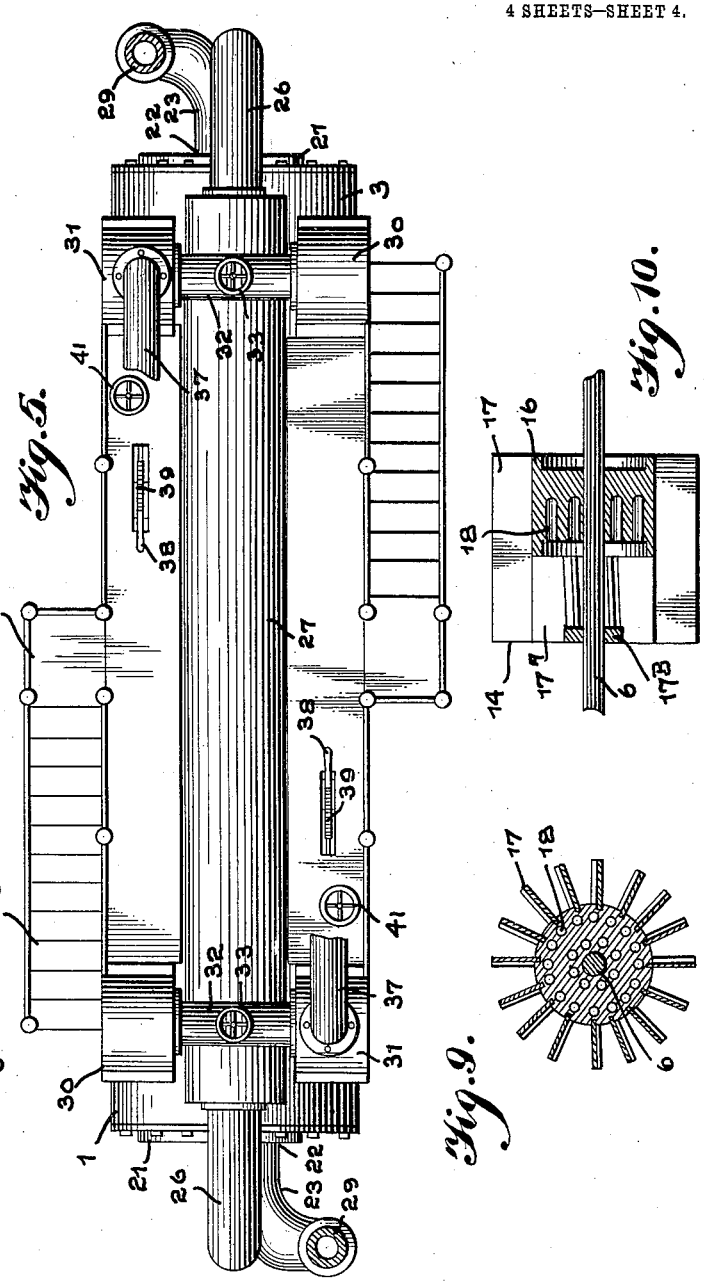
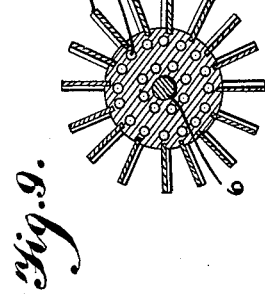
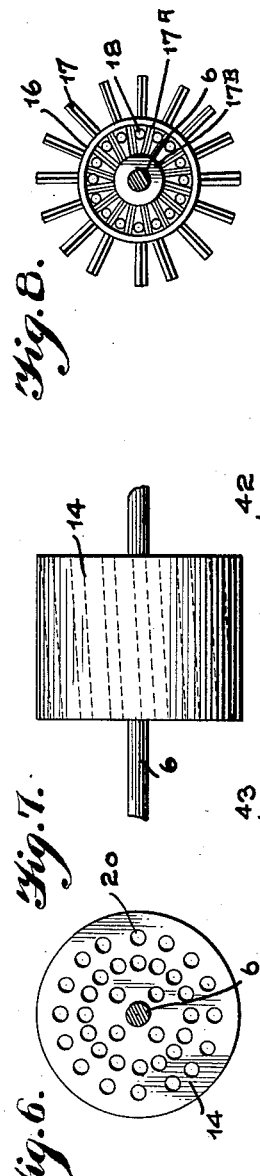
Witnesses
Inventor
John Johnson
By Joshua R. H. Potts
Attorney

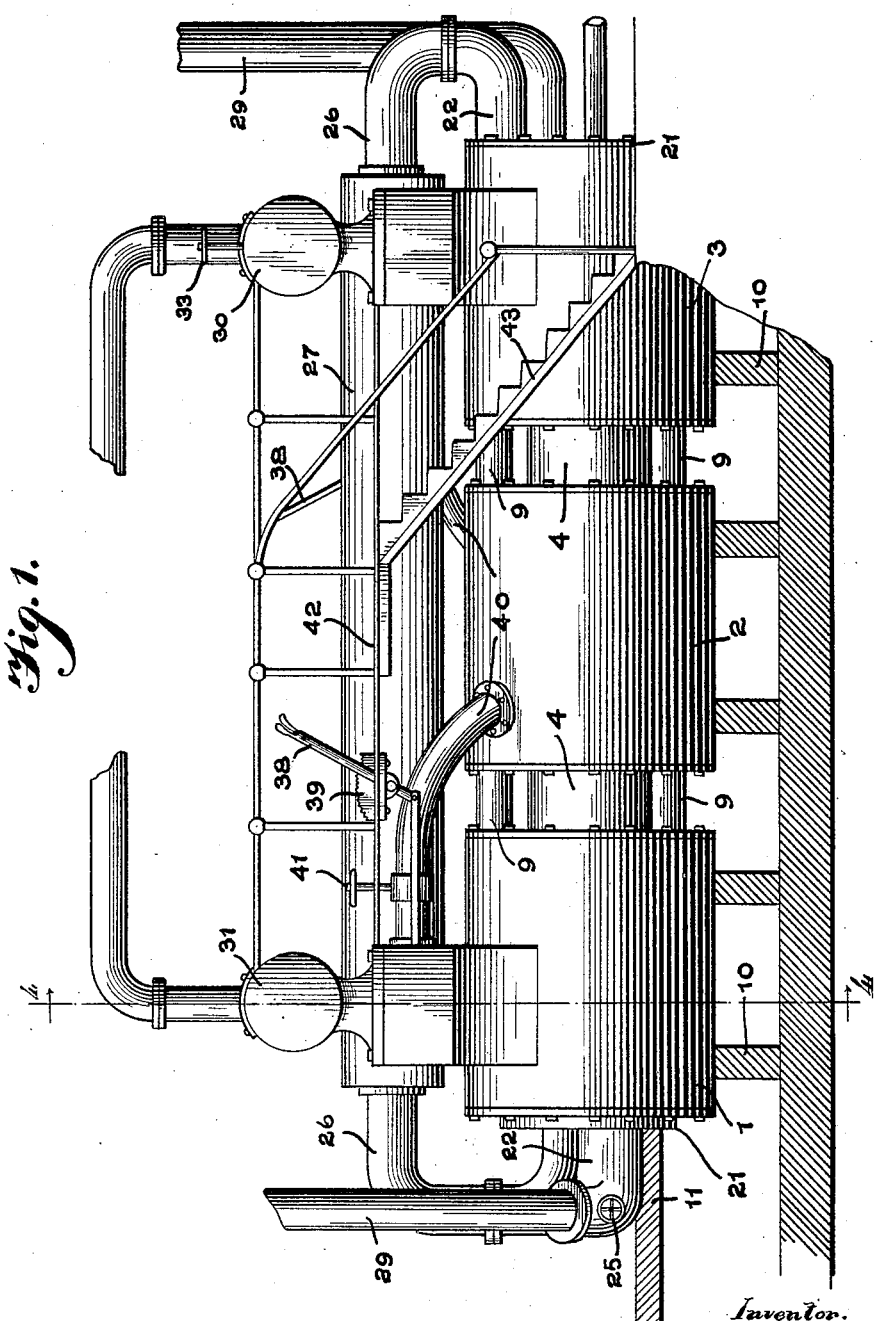

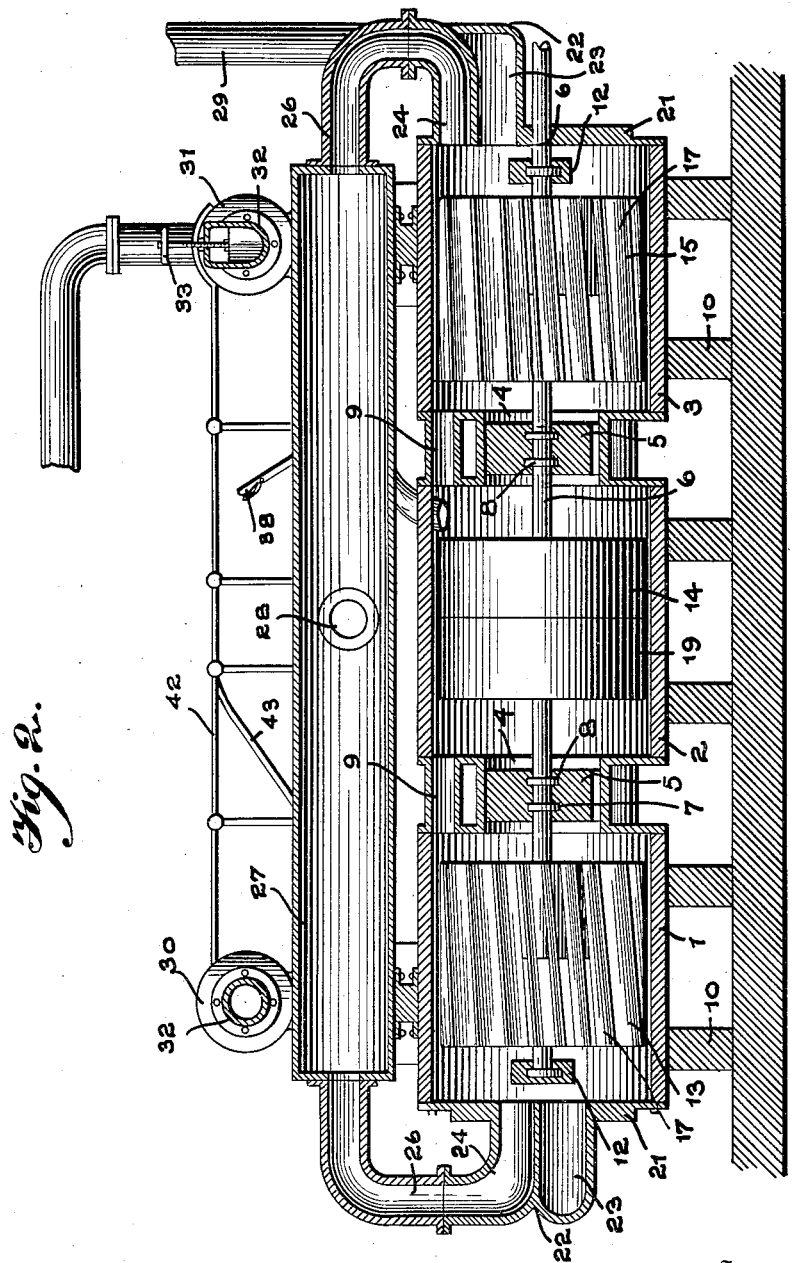

UNITED STATES PATENT OFFICE.

JOHN JOHNSON, OF NORTH SHIELDS, ENGLAND.

ROTARY ENGINE.

1,064,226.

Specification of Letters Patent.

Patented June 10, 1913.

Application filed December 14, 1912. Serial No. 736,695.

*To all whom it may concern:*

Be it known that I, JOHN JOHNSON, a subject of the King of Great Britain, residing at North Shields, England, have invented certain new and useful Improvements in Rotary Engines, of which the following is a specification.

My invention relates to improvements in rotary engines, the object of the invention being to provide a rotary engine in which steam, compressed air or other fluid gas may be utilized to drive the engine at a high speed with a minimum of fluid pressure.

A further object is to provide an engine of this character comprising a plurality of rotary elements which receive the steam or other fluid tangentially upon a circular series of inclined vanes and which receive the steam or other fluid longitudinally of their axis through inclined ports, whereby the passage of the steam in both directions is utilized to impart a rotary motion to the rotary elements.

A further object is to provide improved means for reversing the engine.

A further object is to provide improved rotary elements supported in communicating cylinders, and secured upon a shaft common to all of the elements, and supported in improved bearings, whereby the endwise thrust of the shaft is supported.

A further object is to provide an improved rotary engine which is especially adapted for use as a marine engine and which is designed to greatly increase the speed of vessels over the speed attained with engines such as now provided.

With these and other objects in view, the invention consists in certain novel features of construction and combinations and arrangements of parts, as will be more fully hereinafter described and pointed out in the claims.

In the accompanying drawings: Figure 1 is a view in side elevation illustrating my improvements. Fig. 2 is a view in longitudinal section. Fig. 3 is an end elevation. Fig. 4 is a view in section on the line 4—4 of Fig. 1 with the rotary element removed to illustrate parts behind the same. Fig. 5 is a top plan view, and Figs. 6, 7, 8, 9, and 10 are views illustrating various details of construction.

My improved engine comprises a series of cylinders 1, 2, and 3, connected by shorter cylinders 4 of reduced diameter which are located centrally and concentrically with the cylinders 1, 2, and 3, and serve as supports for bearings 5 in which the shaft 6 is mounted. These bearings 5 are made in two parts and are grooved as shown at 7 to receive flanges 8 on the shaft 6 and prevent any longitudinal movement of the shaft, thus sustaining the endwise thrust. The cylinders are also connected by short pipes 9 which are located near the periphery of the cylinder. These pipes 9 serve as passages for the steam or other fluid as will be hereinafter explained. The cylinders are preferably supported upon beams 10, and are so located that they extend appreciably below the floor or deck 11.

The shaft 6 is supported at the forward end of cylinder 1 and at the rear end of cylinder 3 in transverse bars 12, and on the shaft and the cylinders 1, 2, and 3, rotary elements 13, 14, and 15 respectively are secured. The elements 13 and 15 are alike in construction but the element 14 in the center cylinder is differently constructed as will be hereinafter explained. The elements 13 and 15 comprise a body portion 16 located at one end of the element and around which a circular series of blades or vanes 17 are fixed. These blades or vanes are appreciably longer than the body portion and extend at one end beyond the body portion and incline from one end to the other, and the body portion 16 is provided with a plurality of inclined openings or passages 18.

Shorter inclined blades or vanes 17$^a$ are fixed to the ends of the body portion 16 and terminate in alinement with the ends of blades 17. These inner set of blades are supported by a ring or collar 17$^b$, and they serve to further utilize the impact of the steam to drive the rotary element. When I use this term "inclined" I use it to define a direction which is at an angle to the axis of the element, so that the passage of the steam in either direction exerts a cam action either on the surfaces of the blades or vanes 17 or on the walls of the openings 18 to impart to the rotary element a rotary motion from the impact and pressure of the steam when directed thereagainst either tangentially or axially.

The element 14 comprises two or more separate members 19 which are in the form of cylindrical blocks having inclined openings or passages 20 therethrough. These elements are all of a diameter to turn freely in the cylinders yet allow no waste space and they are driven by the steam as will now be explained.

The outer heads 21 of cylinders 1 and 3 have integral pipe angles 22. The two members of these pipe angles constitute respectively a steam inlet 23 and an outlet 24, the inlet being provided with a cock 25 to control the passage of steam therethrough. The outlets 24 are connected by pipes 26 with a condenser 27, the latter having a suitable outlet 28 through which the exhaust may be conveyed to any suitable point for discharge. The inlets 22 are connected by steam pipes 29 with the steam supply (not shown) and these steam pipes discharge the steam through the inlets 23 axially of the rotary elements and by reason of the inclined surfaces of the vanes and passages above explained, impart a rotary motion to the elements. On top of cylinders 1 and 3, steam chests 30 and 31 respectively are located. These steam chests are connected by a pipe 32 which is normally closed by a cock 33. The chests 30 and 31 are connected by passages 34 and 35 respectively and in the passages 35, slide valves 36 are located. The steam chests 31 are connected by pipes 37 with a source of steam supply, and the passages 34 and 35 are elongated and are narrow so as to discharge the steam in a thin extended area tangentially against the blades or vanes on the rotary elements. By reference particularly to Fig. 4, it will be seen that these passages 34 and 35 are located at opposite sides of the centers of the cylinders, so that when the steam is passing through one of the passages, the rotary element will be turned in one direction, and when passing through the other of the passages, the rotary element will be turned in the opposite direction. The slide valves 36 are illustrated in the simplest possible form, and they are controlled by hand levers 38. These hand levers 38 are adapted to lock with segments 39 so as to hold the valve at any position of adjustment.

The steam chests 31 are connected by pipes 40 with the opposite sides of the center cylinder 2, and in these pipes 40, cocks 41 are located to control the passage therethrough. It is to be understood that when the rotary elements are turning in one direction, the steam will be admitted through the steam inlet 22 at the left hand end of Figs. 1 and 2, and through all of the steam passages on the near side of the engine. When the engine is reversed, these passages are closed and the passages on the opposite side opened. The steam which enters through the passages on the sides of the engine strikes against the outer blades or vanes 17 tangentially and the steam which passes through the cylinders longitudinally, passes longitudinally through the rotary elements. The short pipes 9 permit this steam to pass longitudinally through all of the cylinders and exhausts at the opposite end into the condenser 27.

The arrangement of cocks and valves above described permits the engine to be controlled in accordance with the speed and power desired to impart to the shaft 6, and while this engine is particularly adapted for use as a marine engine and the shaft 6 as a propeller shaft, the invention is not limited to this particular use.

While I have illustrated an arrangement of platforms 42 and stairways 43, it is of course understood that these details are non-essentials.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An engine of the character described, comprising a casing, a rotary element mounted to turn in the casing, said rotary element comprising a cylindrical body portion, and a circular series of inclined blades or vanes, said blades or vanes of an appreciably greater length than the length of the body portion and secured to the periphery of said body portion with the free ends of said blades projecting in circular series an appreciable distance beyond one end of said body portion, substantially as described.

2. An engine of the character described, comprising a casing, a rotary element mounted to turn in the casing, said rotary element comprising a cylindrical body portion, and a circular series of inclined blades or vanes, said blades or vanes of an appreciably greater length than the length of the body portion and secured to the periphery of said body portion with the free ends of said blades projecting in circular series an appreciable distance beyond one end of said body portion, and said body portion having a plurality of longitudinally and angularly positioned passages therethrough, substantially as described.

3. An engine of the character described, comprising a casing, a rotary element mounted to turn in the casing, said rotary element comprising a cylindrical body portion, and a circular series of inclined blades or vanes, said blades or vanes of an appreciably greater length than the length of the body portion and secured to the periphery of said body portion with the free ends of said blades projecting in circular series an appreciable distance beyond one end of said body portion, and means for directing steam tangentially against the blades, substantially as described.

4. An engine of the character described, comprising a casing, a rotary element mounted to turn in the casing, said rotary element comprising a body portion, a circular series of inclined blades or vanes secured to the body portion and projecting at one end beyond the same, said body portion having a plurality of longitudinally and angularly positioned passages therethrough, and means for directing steam tangentially against said blades, substantially as described.

5. An engine of the character described, comprising a casing, a rotary element mounted to turn in the casing, said rotary element comprising a body portion, a circular series of inclined blades or vanes secured to the body portion and projecting at one end beyond the same, means for directing steam tangentially against said blades or vanes, and means for directing steam longitudinally through said rotary element, substantially as described.

6. An engine of the character described, comprising a casing, a rotary element mounted to turn in the casing, said rotary element comprising a body portion, a circular series of inclined blades or vanes secured to the body portion and projecting at one end beyond the same, said body portion having a plurality of longitudinally and angularly positioned passages therethrough, means for directing steam tangentially against said blades or vanes, and means for directing steam longitudinally through said rotary element, substantially as described.

7. An engine of the character described, comprising a casing, a rotary element mounted to turn in the casing, said rotary element comprising a body portion, a circular series of inclined blades or vanes secured to the body portion and projecting at one end beyond the same, steam chests on top of the casing, a pipe connecting the steam chests, passages communicating with the steam chests and adapted to direct the steam in an extended area tangentially against the said blades or vanes at opposite sides of the casing, and valves controlling the flow of steam through said passages, substantially as described.

8. An engine of the character described, comprising a casing, a rotary element mounted to turn in the casing, said rotary element comprising a body portion, a circular series of inclined blades or vanes secured to the body portion and projecting at one end beyond the same, said body portion having a plurality of longitudinally and angularly positioned passages therethrough, steam chests on top of the casing, a pipe connecting the steam chests, passages communicating with the steam chests and adapted to direct the steam in an extended area tangentially against the said blades or vanes at opposite sides of the casing, and valves controlling the flow of steam through said passages, substantially as described.

9. An engine of the character described, comprising a casing, a rotary element mounted to turn in the casing, said rotary element comprising a body portion, a circular series of inclined blades or vanes secured to the body portion and projecting at one end beyond the same, steam chests on top of the casing, a pipe connecting the steam chests, passages communicating with the steam chests and adapted to direct the steam in an extended area tangentially against the said blades or vanes at opposite sides of the casing, valves controlling the flow of steam through said passages, and means for directing steam through the end of the casing and discharging the same longitudinally through the rotary element, substantially as described.

10. An engine of the character described, comprising a casing, a rotary element mounted to turn in the casing, said rotary element comprising a body portion, a circular series of inclined blades or vanes secured to the body portion and projecting at one end beyond the same, said body portion having a plurality of longitudinally and angularly positioned passages therethrough, steam chests on top of the casing, a pipe connecting the steam chests, passages communicating with the steam chests and adapted to direct the steam in an extended area tangentially against the said blades or vanes at opposite sides of the casing, valves controlling the flow of steam through said passages, and means for directing steam through the end of the casing and discharging the same longitudinally through the rotary element, substantially as described.

11. In a rotary engine, the combination with three cylinders positioned in alinement and communicating with each other, of rotary elements in said cylinders, the end elements comprising a body portion and a circular series of angularly positioned blades or vanes secured thereto, the rotary element in the intermediate cylinder comprising a body having inclined passages therethrough, means for directing steam tangentially against the elements in the end cylinders, and means for directing steam longitudinally through all of the elements, substantially as described.

12. In a rotary engine, the combination with three cylinders positioned in alinement and communicating with each other, of rotary elements in said cylinders, the end elements comprising a body portion and a circular series of angularly positioned blades or vanes secured thereto, the rotary element in the intermediate cylinder comprising a body having inclined passages therethrough, means for directing steam tangentially against the elements in the end cylinders, means for directing steam longitudinally through all of the elements, a condenser, and outlet pipes communicating with the ends of the end cylinders and discharging into said condenser, substantially as described.

13. An engine of the character described, comprising a casing, a rotary element mounted to turn in the casing, said rotary element comprising a body portion, and a circular series of inclined blades or vanes secured to the body portion and projecting at one end beyond the same, and a second series of inclined blades or vanes located within the circle formed by the first-mentioned blades or vanes and secured at one end to the body portion, substantially as described.

14. An engine of the character described, comprising a casing, a rotary element mounted to turn in the casing, said rotary element comprising a body portion, a circular series of inclined blades or vanes secured to the body portion and projecting at one end beyond the same, said body portion having a plurality of longitudinally and angularly positioned passages therethrough, and a second series of inclined blades or vanes located within the circle formed by the first-mentioned blades or vanes and secured at one end to the body portion, substantially as described.

In testimony whereof I have signed my name to this specification in the presence of two subscribing witnesses.

JOHN JOHNSON.

Witnesses:
  JAMES LOWE,
  HERMAN J. ESSELBARN.

---

Copies of this patent may be obtained for five cents each, by addressing the "Commissioner of Patents, Washington, D. C."